(12) United States Patent
Eagles

(10) Patent No.: US 12,501,883 B2
(45) Date of Patent: Dec. 23, 2025

(54) BAG-AND-EXCREMENT HOLDER / FASHION GARMENT FOR PETS

(71) Applicant: Stuart Eagles, Welland (CA)

(72) Inventor: Stuart Eagles, Welland (CA)

(\*) Notice: Subject to any disclaimer, the term of this patent is extended or adjusted under 35 U.S.C. 154(b) by 0 days.

(21) Appl. No.: 18/144,091

(22) Filed: May 5, 2023

(65) Prior Publication Data

US 2024/0081291 A1    Mar. 14, 2024

Related U.S. Application Data

(60) Provisional application No. 63/338,769, filed on May 5, 2022.

(51) Int. Cl.
*A01K 27/00* (2006.01)
*A01K 13/00* (2006.01)

(52) U.S. Cl.
CPC .......... *A01K 27/008* (2013.01); *A01K 13/006* (2013.01)

(58) Field of Classification Search
CPC .... A01K 27/008; A01K 13/006; A41D 23/00; A41D 2023/002; A41D 2023/004
See application file for complete search history.

(56) References Cited

U.S. PATENT DOCUMENTS

| | | | | |
|---|---|---|---|---|
| 5,465,689 | A * | 11/1995 | Winder | A01K 13/003 119/654 |
| 6,257,473 | B1 * | 7/2001 | Ringelstetter | E01H 1/1206 224/675 |
| 6,418,881 | B1 * | 7/2002 | Starratt | A01K 27/006 119/769 |
| 6,450,129 | B1 * | 9/2002 | Flynn | A01K 27/003 119/770 |
| 7,427,417 | B2 * | 9/2008 | Jendrucko | A61Q 13/00 435/283.1 |
| 7,918,192 | B1 * | 4/2011 | Digh | A01K 27/006 119/850 |
| 2010/0269763 | A1 * | 10/2010 | Kraft | A01K 27/006 383/38 |
| 2016/0183497 | A1 * | 6/2016 | Dewey | A01K 27/001 119/858 |
| 2019/0200573 | A1 * | 7/2019 | Smith | A41D 13/0015 |
| 2020/0029533 | A1 * | 1/2020 | Badr | A01K 27/008 |

\* cited by examiner

*Primary Examiner* — Christopher D Hutchens
*Assistant Examiner* — Nevena Aleksic

(57) ABSTRACT

A novel bag-and-excrement holder for use with pets comprises a main sheet portion having a pet facing surface and an outwardly facing surface. An excrement retaining receptacle has a mouth at the outwardly facing surface of the main sheet portion for passing excrement retaining bags therethrough. A bag storage receptacle has a mouth at the pet facing surface of the main sheet portion for passing excrement retaining bags therethrough. A first and second connection portions extend outwardly from the main sheet portion. In use, with the bag-and-excrement holder wrapped around neck of a pet, with the first connection portion and the second connection portion interconnected each with the other to retain the bag-and-excrement holder in place in the spread-out configuration, the pet facing surface is against the pet, the mouth of the excrement retaining receptacle faces outwardly, and the mouth of the bag storage receptacle faces the pet.

18 Claims, 12 Drawing Sheets

BAG-AND-EXCREMENT HOLDER / FASHION GARMENT FOR PETS

FIELD OF THE INVENTION

The present invention relates to bag-and-excrement holders, and more particularly to bag-and-excrement holders that are highly functional, easy to use, not unsightly and are fashionable.

BACKGROUND OF THE INVENTION

In earlier times, it was somewhat common for pet owners to not concern themselves about any excrement left behind by their pets while walking them in public. In modern society, it is dictated by law that pet owners clean up excrement left behind by a in public area. Clean up of that excrement during a walk is an undesirable part of the walk. Fortunately, small plastic bags can readily be carried and the excrement can be picked up using the small plastic bags. The bags maybe used directly in a person's hand or maybe used in conjunction with an apparatus to help pick up the excrement.

In any event, it is necessary to dispose of the excrement at some point. Often, the bag of excrement is disposed in a nearby public trash can, although this 's typically against municipal bylaws. Often, the bag of pet excrement is carried for a distance back to the pet owner's home. The carrying of a bag of pet excrement in one hand for such a distance is highly undesirable. Accordingly, various types of prior art carriers for pet excrement have been developed.

There are various products on the market for carrying pet waste. These products are typically unsightly and not fashionable, and it is reasonably obvious what their purpose is, which is highly undesirable.

The relevant known prior art will now be discussed.

One relevant prior art patent document is U.S. Pat. No. 6,418,881B1, issued Jul. 16, 2002, to Starratt, and entitled Leash Pouch. This is a leash pouch for storing disposable bags and for temporarily storing animal waste comprising a first pocket having an opening and a second pocket having an opening. The second pocket has a device for at least partially restricting its opening whereby at least one disposable plastic bag can be stored in the second pocket. The first pocket also has a device for selectively closing its opening, the first pocket being adapted to temporarily store a plastic bag having animal waste therein. The pouch has an upper fastener device for detachable securement to a handle portion of a leash for the animal and has a lower device for slidable connection with a linear portion of the leash.

Another relevant prior art patent document is U.S. Pat. No. 10,455,815B2, issued Oct. 29, 2019, to Knight, and entitled Pet Leash with Pet Waste Pickup/Carry Bag. This pet leash with a removably attached disposable plastic bag for picking up dog waste and holding the dog waste during a walk. The plastic bag can be removably contained within a pouch that is removably attached to the leash. During a walk, when needing to retrieve pet waste, the bag can be opened and the user insert his hand from the bottom of the bag and the bag is partially or completely turned inside-out for retrieving the pet waste. With the hand in the bag, it is possible to reach down and pick up the dog waste by grasping the pet waste through the material of the bag. After all the waste is grasped, the user pulls his hand back through the bag to return the bag back to its original orientation with the pet waste within the bag. The bag can then be closed and later removed from the leash to dispose of the bag with the pet waste therein.

Another relevant prior art patent document is United States Published Patent Application US2003/0111022A1, published Jun. 19, 2003, to Woolley et al, and entitled Pouch for Canine Excretement. This pouch has an elongated mouth for gaining access to the interior of the pouch and a zipper for opening and closing the mouth. One or more cords have loops which extend out-wardly from the top of the pouch. A toggle is attached to each cord for increasing and decreasing the size of the loop. The pouch is attached to a leash by first, passing the leash through the opening in each loop and secondly, by tightening the loops around the leash by means of the toggles in order to affix the pouch tightly to the leash so that the pouch does not move on the leash. A cord may also be attached to the handle of the leash should it be difficult to stop the pouch from sliding on the leash.

Another relevant prior art patent document is United States Published Patent Application US2006/0054107A1, published Mar. 16, 2006, to Baker, and entitled Leash-Attachable Pouch for Carrying Dog Waste, With Plastic-Stiffened Fabric Walls. This waste-carrying pouch is for use by pet owners to carry waste (feces) to a trash can or waste basket. The pouch hangs from a leash, near the handle, and can be reversibly opened and closed. An improved design uses a combination of: (i) two attachment points, positioned at the two ends of the pouch, to minimize swinging motion by a pouch loaded with waste, and (ii) walls made of a semi-stiff plastic-impregnated fabric, such as "420D" nylon with a polyvinyl chloride coating, to provide a suitable degree of "stiffening" to make opening and closing the pouch easier and more reliable even when a leash is being jerked and tugged. Pouch-and-leash combinations are also with either standard or retractable leashes, having rings or other coupling devices on the leash, and pouch assortments are disclosed with a range of sizes.

Another relevant prior art patent document is United States Published Patent Application US2021/0092938A1, published Apr. 1, 2021, to Hill, and entitled Doggie Poop Saddle. This invention comprises a one-piece item (saddle) that fits over the back of a dog. This harness is designed with two large pockets which hang on each side of the dog's rib cage, a front neck strap and a back-end strap. The saddle pockets will hold poop collected by the person walking the dog. The walker can retrieve a plastic bag from the "slit" pocket located in the middle of the one-piece saddle on top of the dog's back. This invention frees up the walker from carrying an unsanitary and smelly bag of dog poop by hand for the entire walk. It also provides a vehicle by which the dog walker can help keep the neighborhood and the walking area free of dog poop. This Doggie Poop Saddle can be made to fit small, medium and large dogs.

Another relevant prior art patent document is Patent WO2020/108676A1, published Jun. 4, 2020, to Plail, and entitled Safekeeping and/or Transporting Device on the Body of a Dog, Use and Method. This device comprises carrying/retaining arrangement that is intended for placing around the body of the dog There is at least one pouch arrangement on one side and/or on both sides of the body of the dog. The pouch arrangement is retained laterally on the carrying/retaining arrangement. The pouch arrangement can be filled with one or more dog-excrement bags for transporting purposes.

It can be readily seen that the known prior art carriers for pet excrement have problems or insufficiencies associated with them, are unsightly and are not fashionable.

It is an object of the present invention to provide a bag-and-excrement holder.

It is an object of the present invention to provide a bag-and-excrement holder that is highly functional.

It is an object of the present invention to provide a bag-and-excrement holder that is easy to use.

It is an object of the present invention to provide a bag-and-excrement holder that is not unsightly.

It is an object of the present invention to provide a bag-and-excrement holder that is fashionable.

It is an object of the present invention to provide a bag-and-excrement holder that is readily manufacturable.

It is an object of the present invention to provide a bag-and-excrement holder that is inexpensive to manufacture.

It is an object of the present invention to provide a fashion garment for pets.

It is an object of the present invention to provide a fashion garment for pets that is highly functional.

It is an object of the present invention to provide a fashion garment for pets that is easy to use.

It is an object of the present invention to provide a fashion garment for pets that is not unsightly.

It is an object of the present invention to provide a fashion garment for pets that is fashionable.

It is an object of the present invention to provide a fashion garment for pets that is readily manufacturable.

It is an object of the present invention to provide a fashion garment for pets that is inexpensive to manufacture.

Other objects, advantages, features, and characteristics of the present invention, as well as methods of operation and functions of the related elements of the structure, and the combination of parts and economies of manufacture, will become more apparent upon consideration of the following detailed description and the appended claims with reference to the accompanying drawings, the latter of which is briefly described herein below.

SUMMARY OF THE INVENTION

In accordance with one aspect of the present invention, there is disclosed a novel bag-and-excrement holder for use with pets. The holder comprises a main sheet portion having a pet facing surface and an outwardly facing surface. There is an excrement retaining receptacle that has a mouth at the outwardly facing surface of the main sheet portion for passing excrement retaining bags therethrough. There is also a bag storage receptacle that has a mouth at the pet facing surface of the main sheet portion for passing excrement retaining bags therethrough. A first connection portion extends outwardly from the main sheet portion and a second connection portion extends outwardly from the main sheet portion. The bag-and-excrement holder has a spread-out configuration. In use, with the bag-and-excrement holder wrapped around neck of a pet, with the first connection portion and the second connection portion interconnected each with the other to retain the bag-and-excrement holder in place in the spread-out configuration, most of the pet facing surface is against the pet, the mouth of the excrement retaining receptacle faces outwardly, and the mouth of the bag storage receptacle faces the pet.

In accordance with another aspect of the present invention, there is disclosed a fashion garment for pets. The fashion garment comprises a main sheet portion having a pet facing surface and an outwardly facing surface. There is a first receptacle having a mouth at the outwardly facing surface of the main sheet portion and a second receptacle having a mouth at the pet facing surface of the main sheet portion. A first connection portion extends outwardly from the main sheet portion and a second connection portion extends outwardly from the main sheet portion. The fashion garment has a spread-out configuration. In use, with the fashion garment wrapped around neck of a pet, with the first connection portion and the second connection portion interconnected each with the other to retain the fashion garment in place in the spread-out configuration, most of the pet facing surface is against the pet, the mouth of the first receptacle faces outwardly, and the mouth of the second receptacle faces the pet.

BRIEF DESCRIPTION OF THE DRAWINGS

The novel features which are believed to be characteristic of the apparatus according to the present invention, as to its structure, organization, use and method of operation, together with further objectives and advantages thereof, will be better understood from the following drawings in which a presently known embodiment of the invention will now be illustrated by way of example. It is expressly understood, however, that the drawings are for the purpose of illustration and description only and are not intended as a definition of the limits of the invention. In the accompanying drawings.

Figure 2:
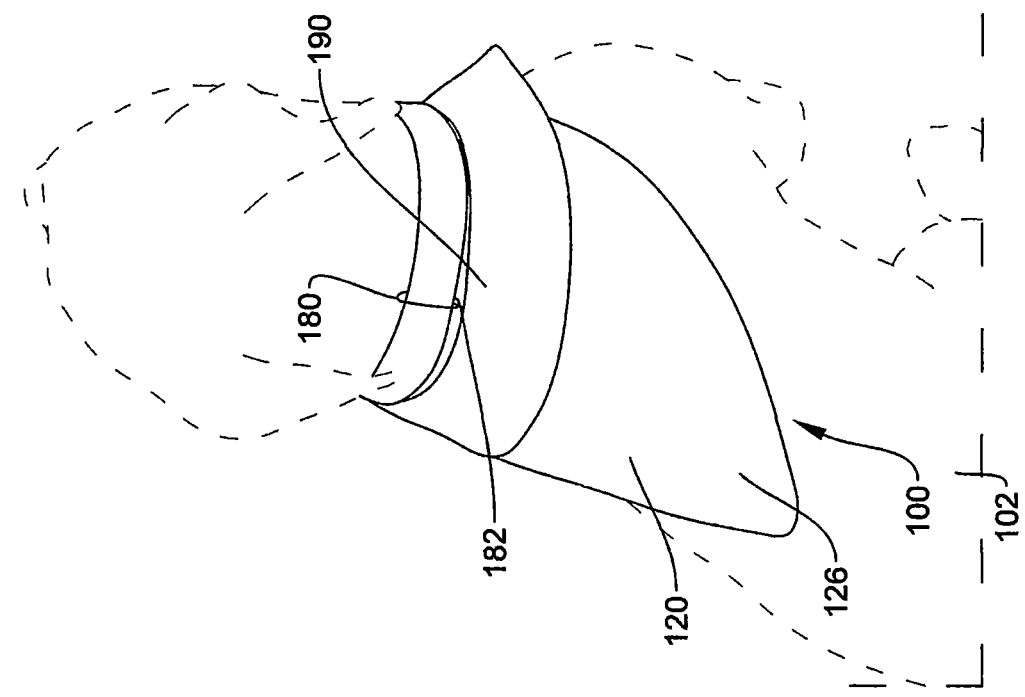
FIG. 2 is a perspective view of the from the rear of the bag-and-excrement holder of FIG. 1, in place on a dog.

LIST OF COMPONENTS AND REFERENCE NUMERALS 100 bag-and-excrement holder
102 pet
110 empty excrement retaining bags
110u used excrement retaining bags
120 main sheet portion
122 pet facing surface
124 outwardly facing surface
126 tail portion
130 excrement retaining receptacle/first receptacle
132 piece of material
134 mouth
140 bag storage receptacle/second receptacle
142 piece of material
144 mouth
144a first mouth
144b second mouth
150 first connection portion
152 robust buttons
160 second connection portion
162 co-operating holes
170 secondary protective bag
180 tie-off
182 clip
190 folder-over collar
192 central rear portion
194 front end portions
200 bag-and-excrement holder
250 first connection portion
252 apertures
260 second connection portion
262 apertures
270 tie-chord

DETAILED DESCRIPTION OF THE ILLUSTRATED EMBODIMENT

Figure 23:
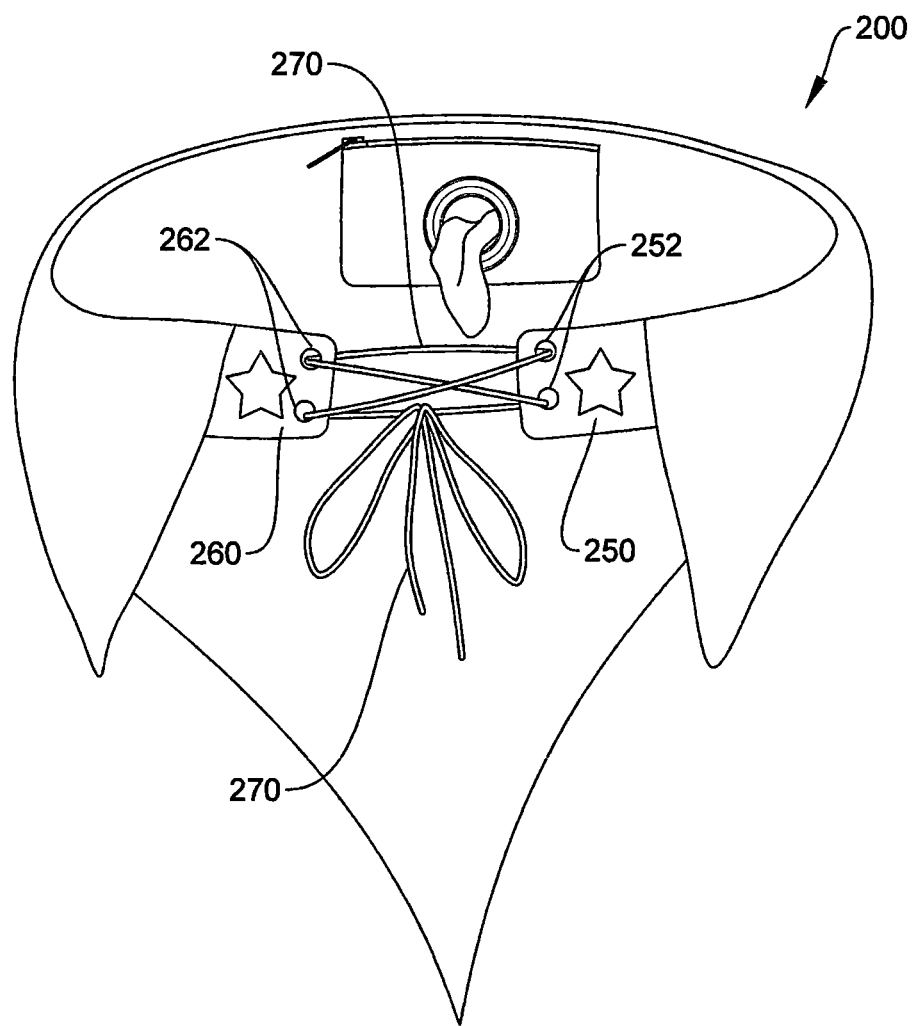

Reference will now be made to FIGS. 1 through 23, wherein FIGS. 1 through 22 show a first illustrated embodiment of the bag-and-excrement holder according to the present invention, as indicated by the general reference numeral 100, and FIG. 23 shows a second illustrated embodiment of the bag-and-excrement holder according to the present invention, as indicated by the general reference numeral 200. The first illustrated embodiment of the bag-and-excrement holder 100 and the second illustrated embodiment of the bag-and-excrement holder 200 are for use with pets, and are also a fashion garment, according to the present invention. The bag-and-excrement holder and fashion garment 100,200, known as the Dukey Bandana™, the Dog Duty™ or the #2 Cargo, cleverly combine function and fashion to give rise to a useful and innovative product that makes an otherwise unsanitary task sanitary again, and also concurrently makes a fashion statement. The pattern of the bandana material gives it a unique look that disguises the function of the bag-and-excrement holder so that it doesn't look like it is carrying used excrement retaining bags.

Reference will now be made to FIGS. 1 through 22, which show a first illustrated embodiment of the bag-and-excrement holder according to the present invention, as indicated by the general reference numeral 100.

In brief, the bag-and-excrement holder 100 for use with pets 102. The bag-and-excrement holder 100 comprises a main sheet portion 120, an excrement retaining receptacle 130, a bag storage receptacle 140, a first connection portion 150, and a second connection portion 160.

More specifically, the main sheet portion 120 comprises a sheet of fabric material, such as a lightweight cotton material or similar, and has a pet facing surface 122 and an outwardly facing surface 124. The main sheet portion 120 is preferably highly fashionable and decorative in nature in order to look good on the pet.

The excrement retaining receptacle 130 is basically a pocket that may be defined by the main sheet portion 120 and by a piece of material 132 attached to the main sheet portion 120. The piece of material 132 may be sewn flat to the main sheet portion 120. The excrement retaining receptacle 130 has a mouth 134 at the outwardly facing surface 124 of the main sheet portion 120 for passing excrement retaining bags 110 therethrough.

Alternatively, the excrement retaining receptacle 130 may be formed into a bag-like pocket that completely encloses articles by itself and has a mouth at one end, with the mouth of the pocket at the mouth 132 of the excrement retaining receptacle 130. In this case, the excrement retaining receptacle 130 is connected to the main sheet portion 120.

There is also a secondary protective bag 170 for retaining a used excrement retaining bag in protected relation therein.

Figure 9:
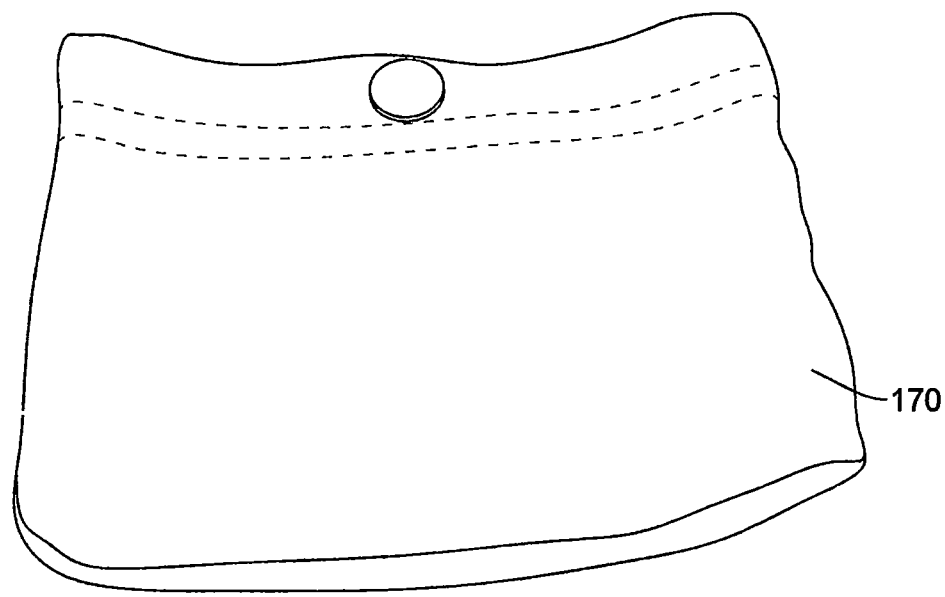
FIG. 9 is an enlarged plan view of the secondary protective bag shown in FIG. 8.
Figure 10:
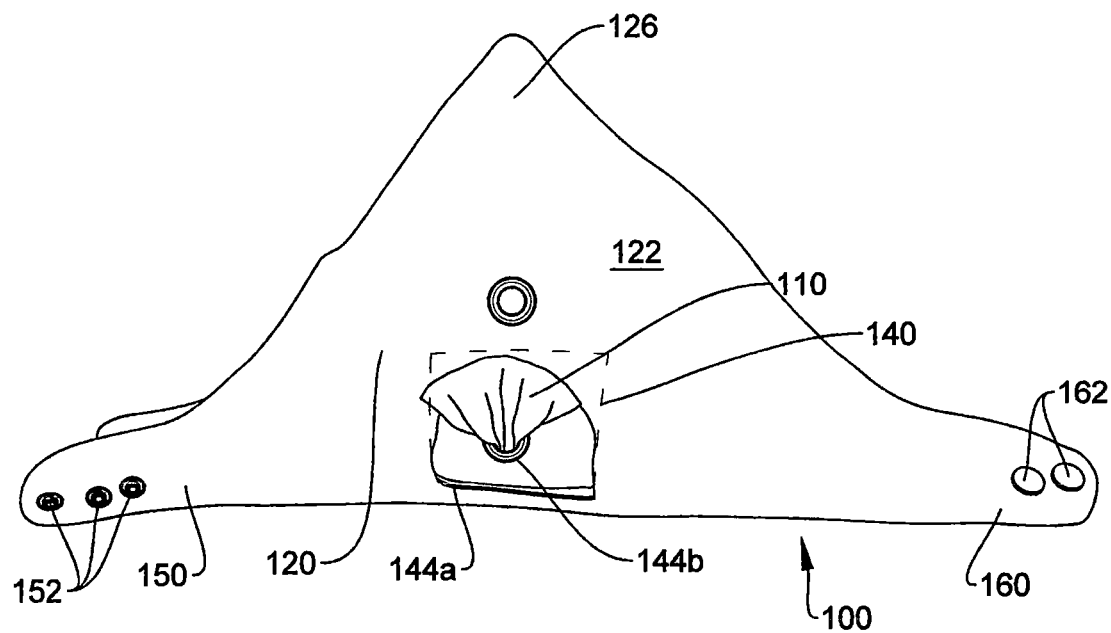
FIG. 10 is a bottom plan view of the bag-and-excrement holder of FIG. 3, showing an empty excrement retaining bag sticking out of the bag storage receptacle.
Figure 11:
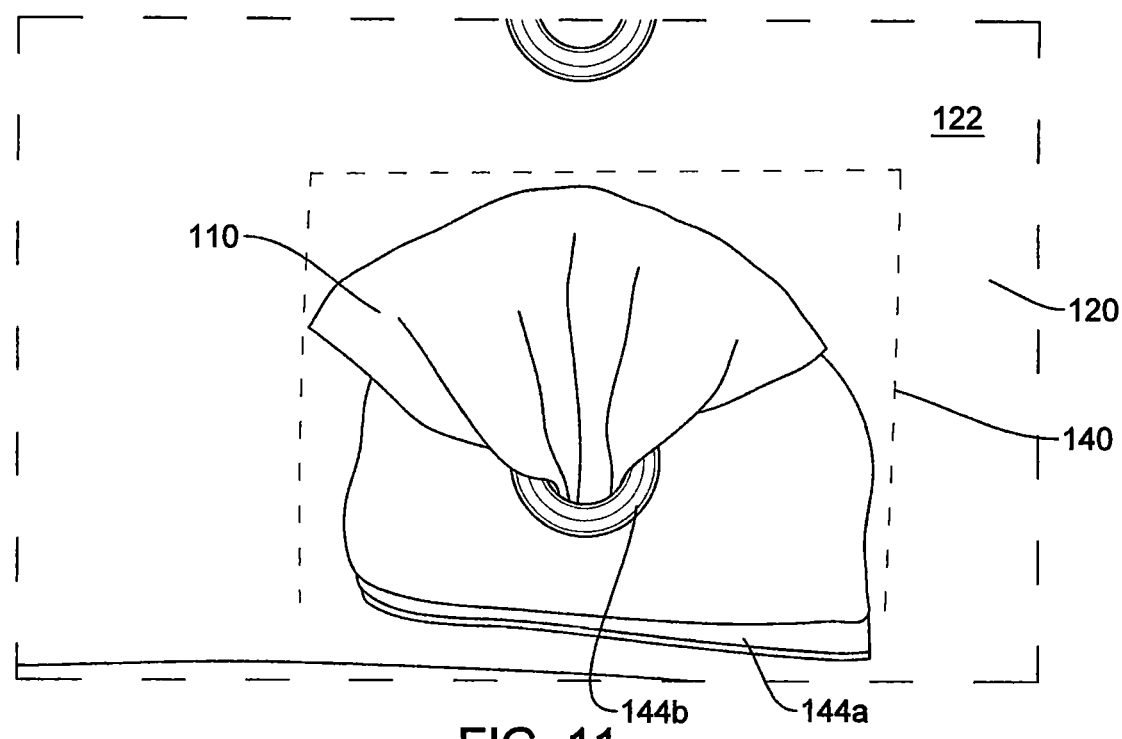
FIG. 11 is an enlarged bottom plan view of the bag-and-excrement holder of FIG. 10, specifically showing the empty excrement retaining bag sticking out of the bag storage receptacle.
Figure 12:
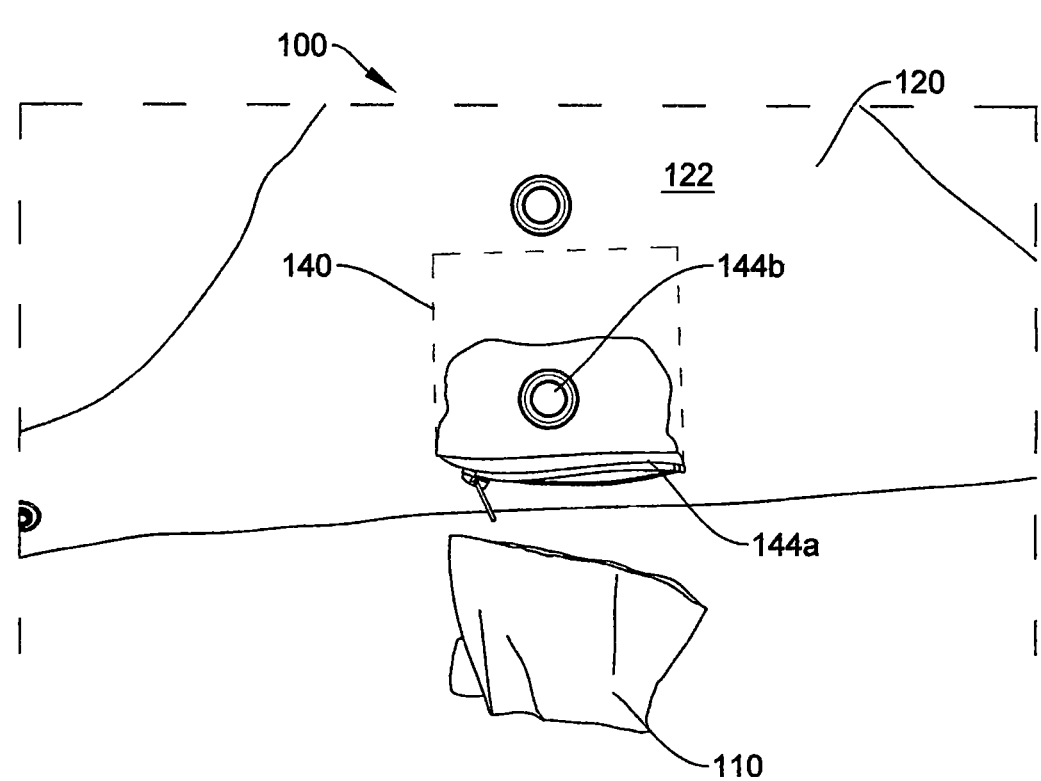
FIG. 12 is a bottom plan view of the bag-and-excrement holder of FIG. 10, specifically showing the empty excrement retaining bag having been removed from the bag storage receptacle, and ready for use by a user to pick up pet excrement.
Figure 13:
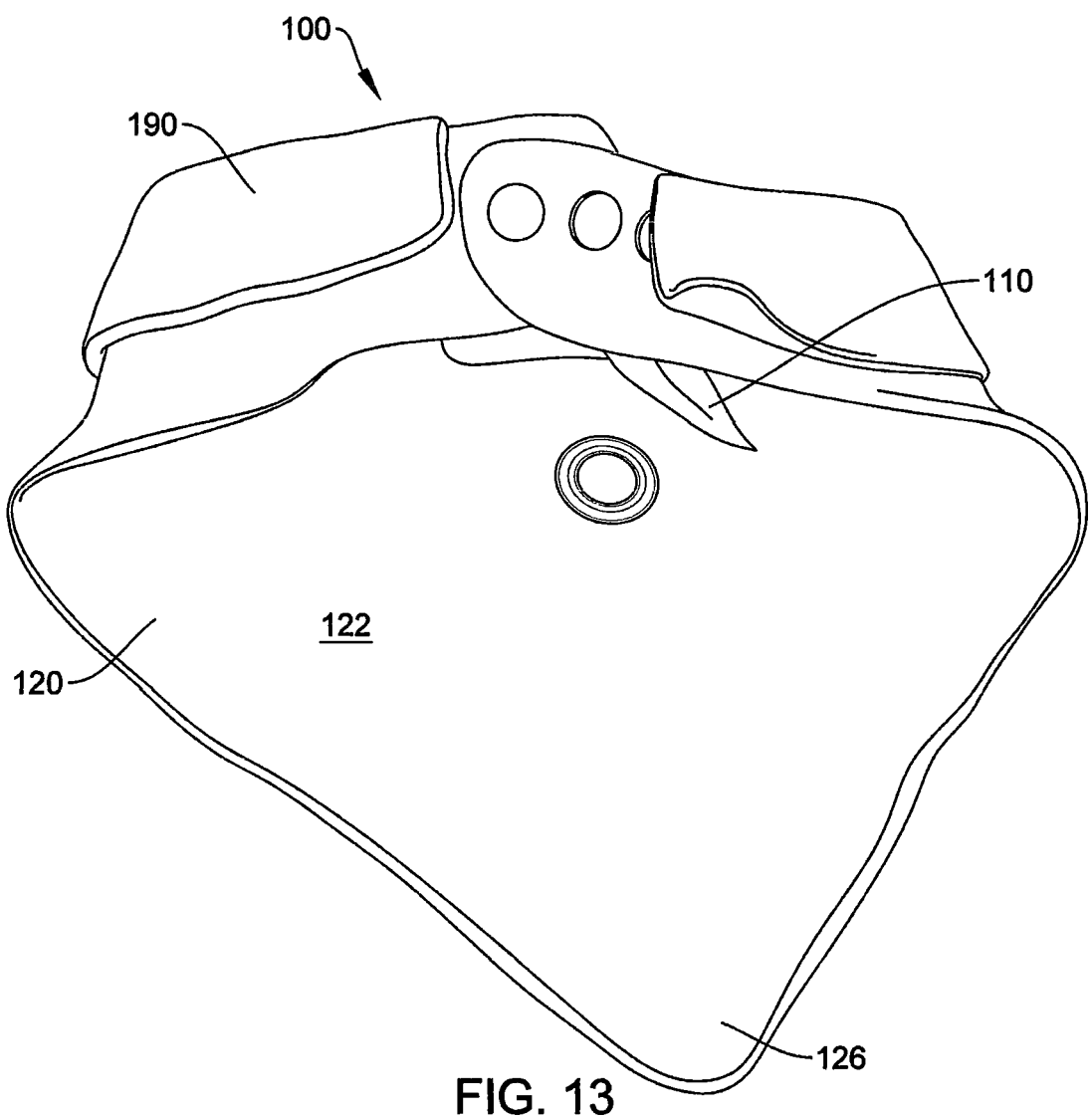
FIG. 13 is a perspective view from the tail end of the bag-and-excrement holder of FIG. 10, with the bag-and-excrement holder in a partially folded configuration, and specifically showing an empty excrement retaining bag at the mouth of the bag storage receptacle, where bags would be inserted into the bag storage receptacle, with the zipper open.
Figure 14:
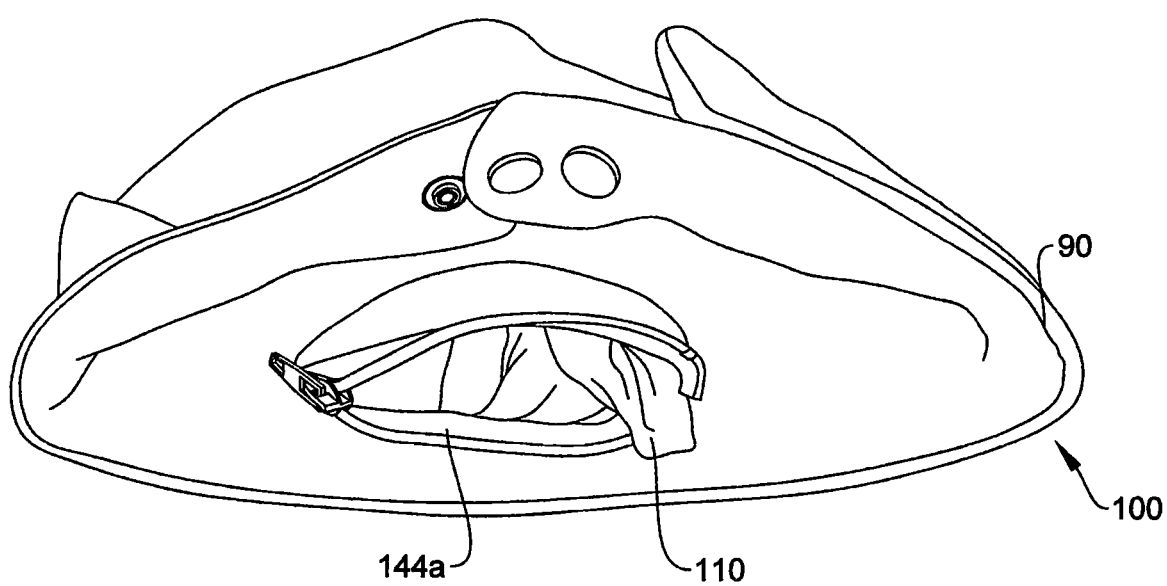
FIG. 14 is a perspective view from the front end of the bag-and-excrement holder of FIG. 10, with the bag-and-excrement holder in a partially folded configuration, and specifically showing an empty excrement retaining bag at the mouth of the bag storage receptacle, where bags would be inserted into the bag storage receptacle, with the zipper open.
Figure 15:
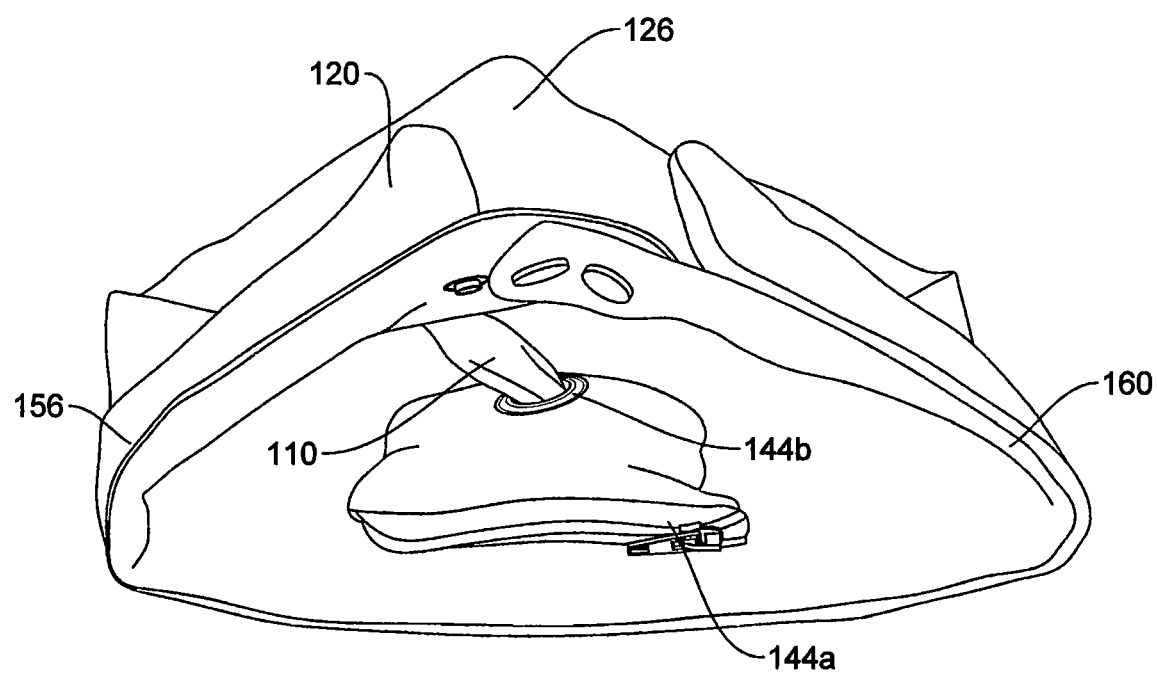
FIG. 15 is a perspective view from the front end of the bag-and-excrement holder similar to FIG. 14, but with the zipper closed.
Figure 16:
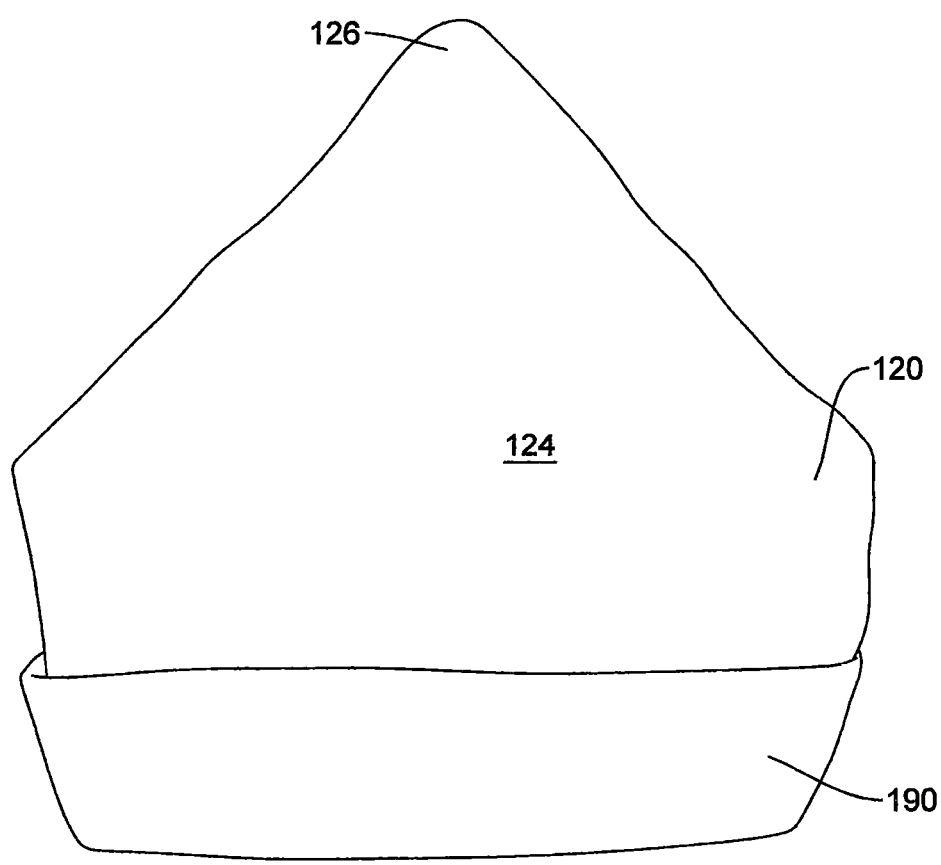
FIG. 16 is a top plan view of the bag-and-excrement holder of FIG. 3, with the bag-and-excrement holder in a partially folded configuration.
Figure 17:
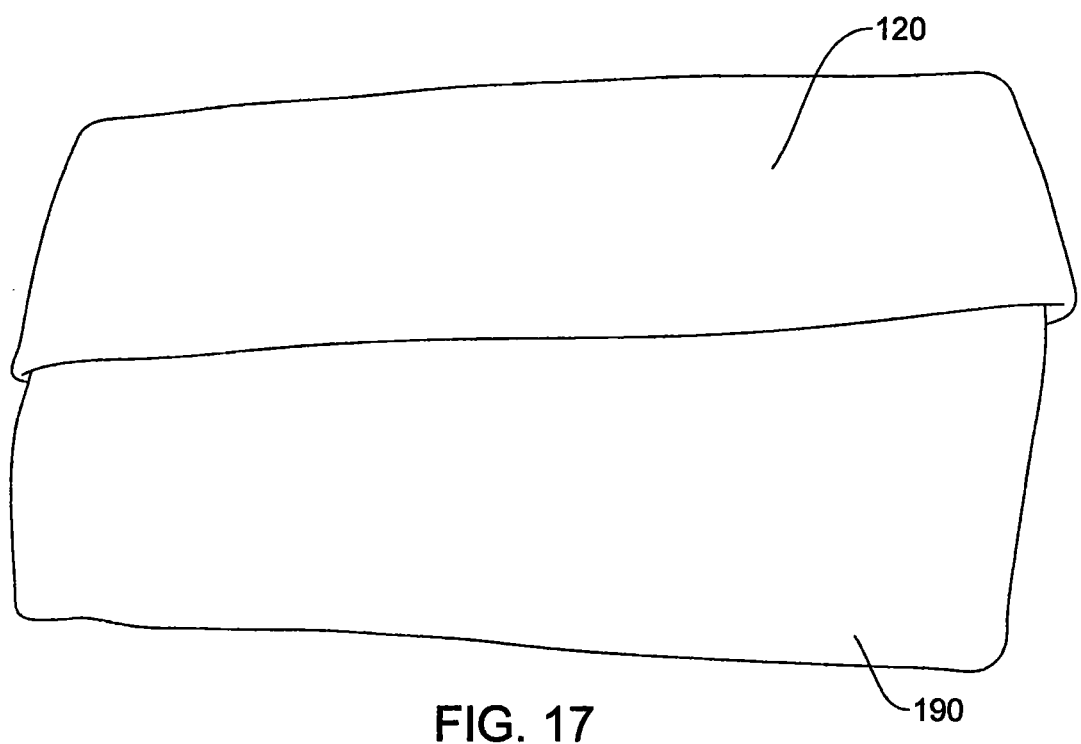
FIG. 17 is a top plan view of the bag-and-excrement holder of FIG. 3, with the bag-and-excrement holder in a partially folded configuration.
Figure 18:
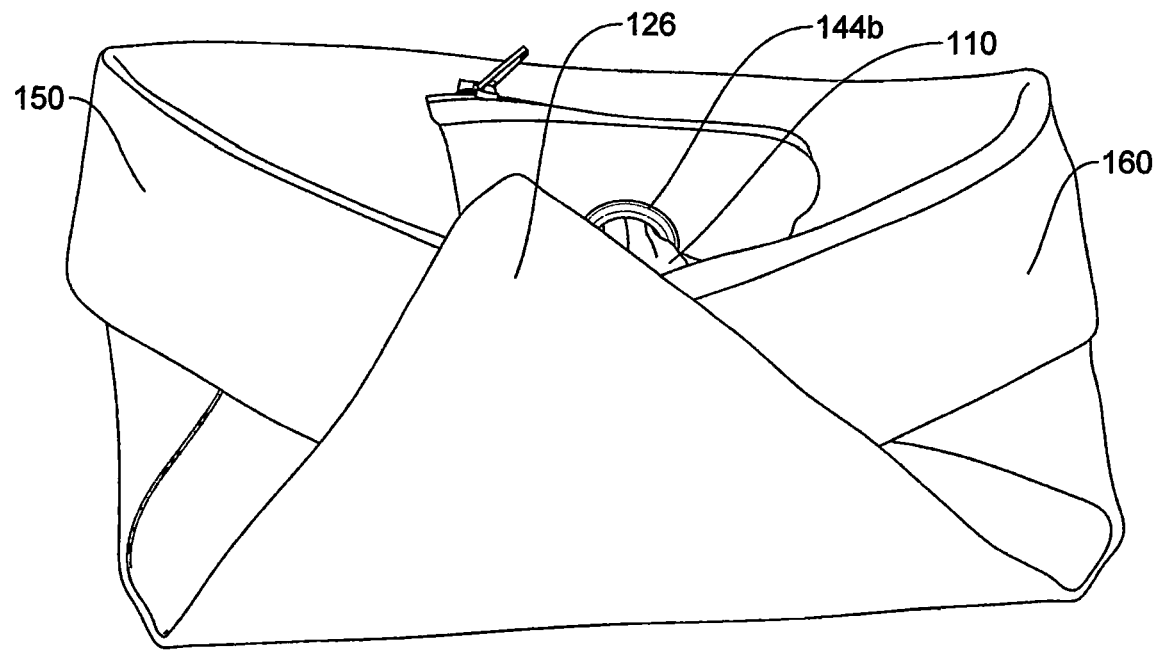
FIG. 18 is a top plan view of the bag-and-excrement holder of FIG. 3, with the bag-and-excrement holder in a partially folded configuration.

The secondary protective bag 170, as shown separately in FIG. 9, is shaped and dimensioned to be received and retained within the excrement retaining receptacle 130.

The bag storage receptacle 140 is also basically a pocket that is used to store empty excrement retaining bags 110 for subsequent removable from the bag storage receptacle 140, typically one-by-one on an as needed basis, and may be defined by the main sheet portion 120 and by a piece of material 142 attached to the main sheet portion 120. The piece of material 142 may be sewn flat to the main sheet portion 120. The bag storage receptacle 140 and has a mouth 144 at the pet facing surface 122 of the main sheet portion 120 for passing excrement retaining bags 110 therethrough.

Alternatively, the bag storage receptacle 140 may be formed into a bag-like pocket that completely encloses articles by itself and has a mouth at one end, with the mouth of the pocket at the mouth 144 of the bag storage receptacle 140. In this case, the bag storage receptacle 140 is connected to the main sheet portion 120.

It should be noted, that in the above described manner, it is not apparent that there are pockets for carrying empty excrement retaining bags 110 and used excrement retaining bags 110.

In the illustrated embodiment, the mouth of the bag storage receptacle 140 comprises a first mouth 144a and a second mouth 144b. The first mouth 144a is used to insert a plurality of empty excrement retaining bags 110 into the bag storage receptacle 140. The second mouth 144b is used to remove empty excrement retaining bags 110 from the bag storage receptacle 140, typically one-by-one on an as needed basis.

There is also a foldable flap or a zipper 146 for selectively closing off and opening the first mouth 144a. The second mouth 144b comprises an open aperture that can be formed in any one of several ways to allow ready removal of the empty excrement retaining bags 110 one-by-one from the bag storage receptacle 140.

The first connection portion 150 may comprise a first strap portion 150 that extends outwardly from the main sheet portion 120. Similarly, the second connection portion 160 comprises a second strap portion 150 that extends outwardly from the main sheet portion 120. The first strap portion 150 and the second strap portion 160 extend in generally opposite directions each to the other. The first connection portion 150 and the second connection portion 160 each wrap around the neck of the pet 102 wearing the bag-and-excrement holder 100 and are securely interconnected each to the other by any suitable means, such as robust buttons 152 on the first connection portion 150 engaged in co-operating holes 162 on the second connection portion 160, and so on.

The bag-and-excrement holder 100 further comprises a tie-off 180 with a clip 182 for anchoring the bag-and-excrement holder 100 to a pet's collar, so as to preclude the bag-and-excrement holder 100 from turning around a pet's neck. The tie-off 180 and clip 182 can be stored in a pocket when they are not in use.

Figure 1:
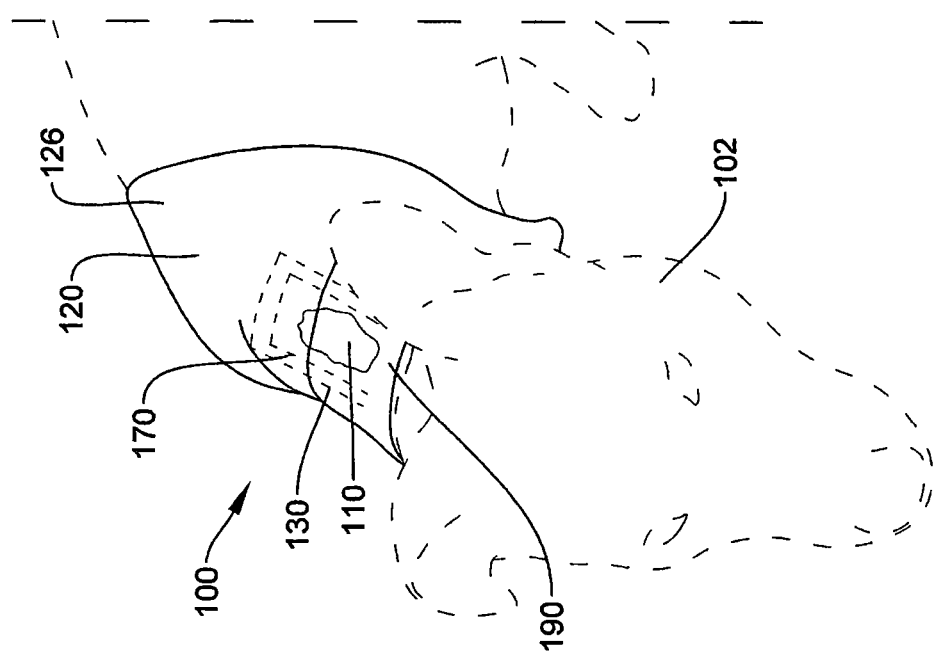
FIG. 1 is a perspective view from the front of a first illustrated embodiment of the bag-and-excrement holder according to the present invention in place on a dog, with the "sky facing" surface of the holder facing outwardly and the pet contacting surface of the holder against the dog.
Figure 3:
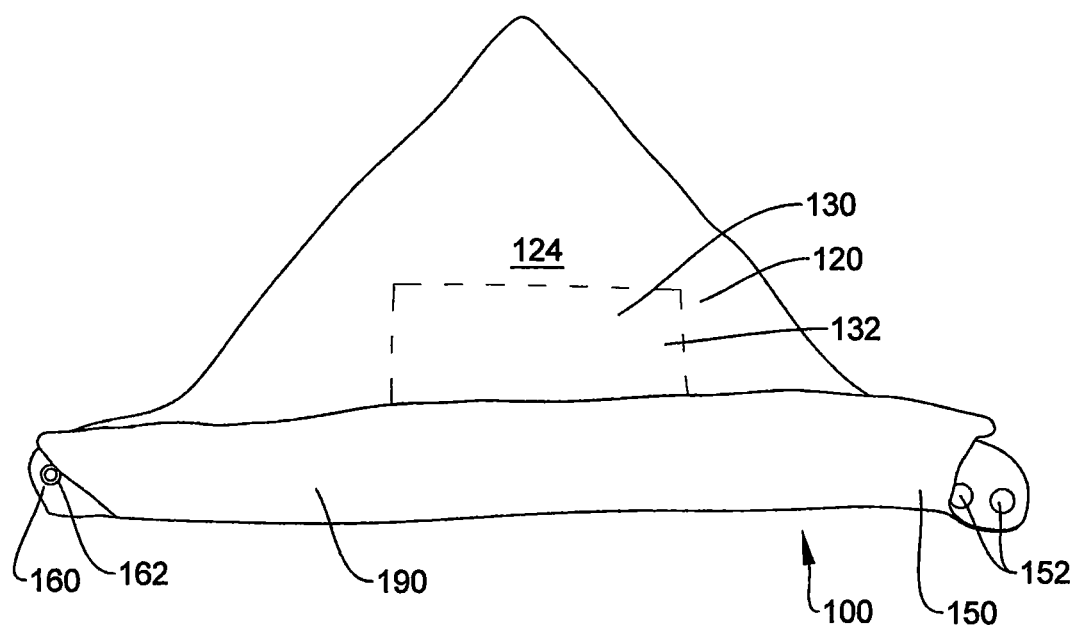
FIG. 3 is a top plan view of the bag-and-excrement holder of FIG. 1, but not in place on a dog, with the cover flap folded over onto the main sheet of the holder.
Figure 4:
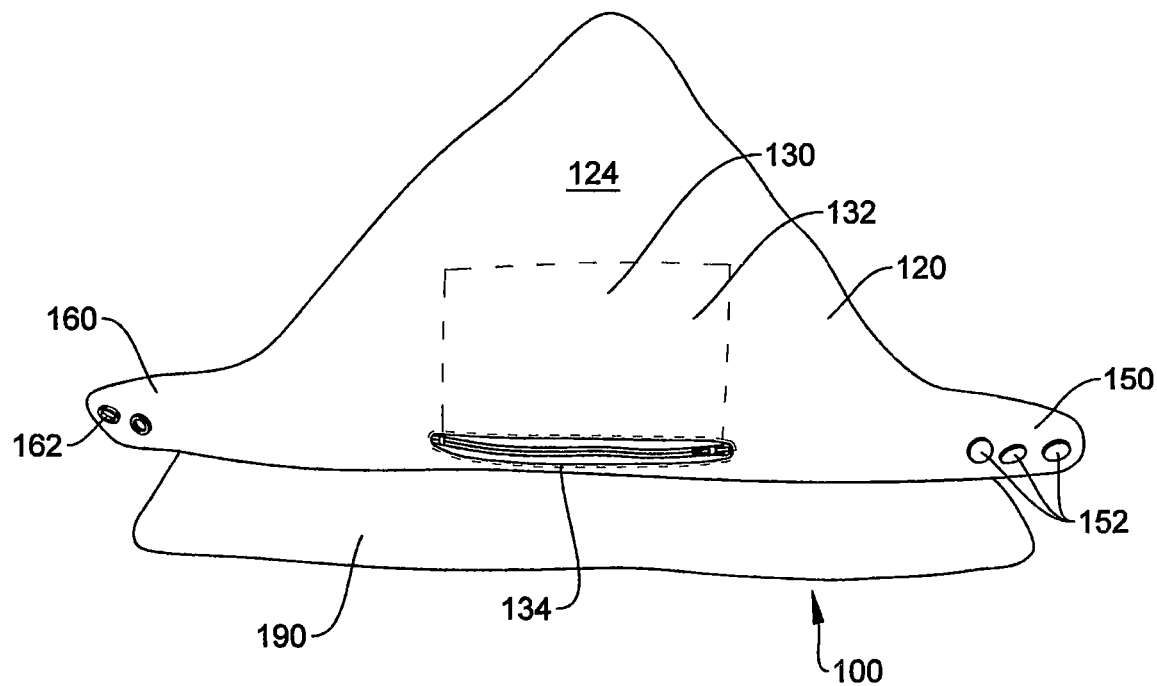
FIG. 4 is a top plan view of the bag-and-excrement holder of FIG. 3, with the cover flap not folded over onto the main sheet of the holder to show the mouth of the excrement retaining receptacle, which is closed by a zipper.
Figure 5:
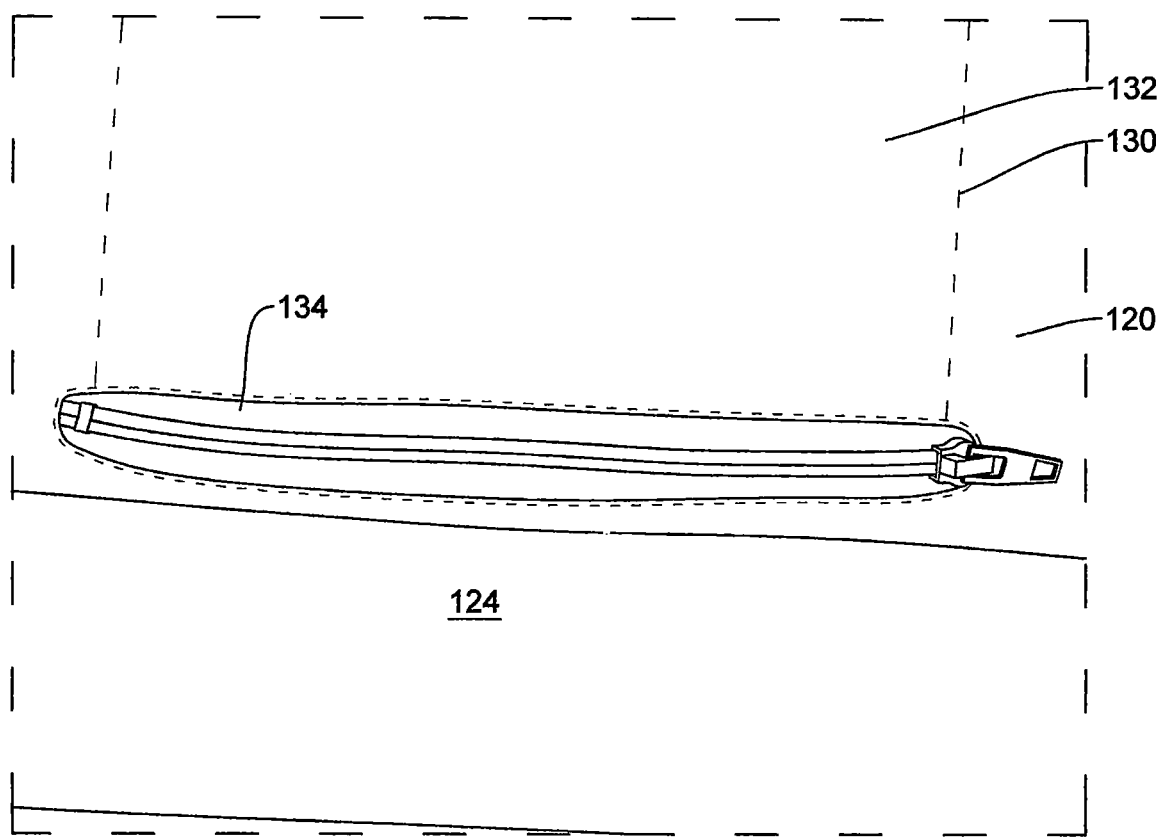
FIG. 5 is an enlarged top plan view of the bag-and-excrement holder of FIG. 3, specifically showing the zipper at the closed mouth of the excrement retaining receptacle.
Figure 6:
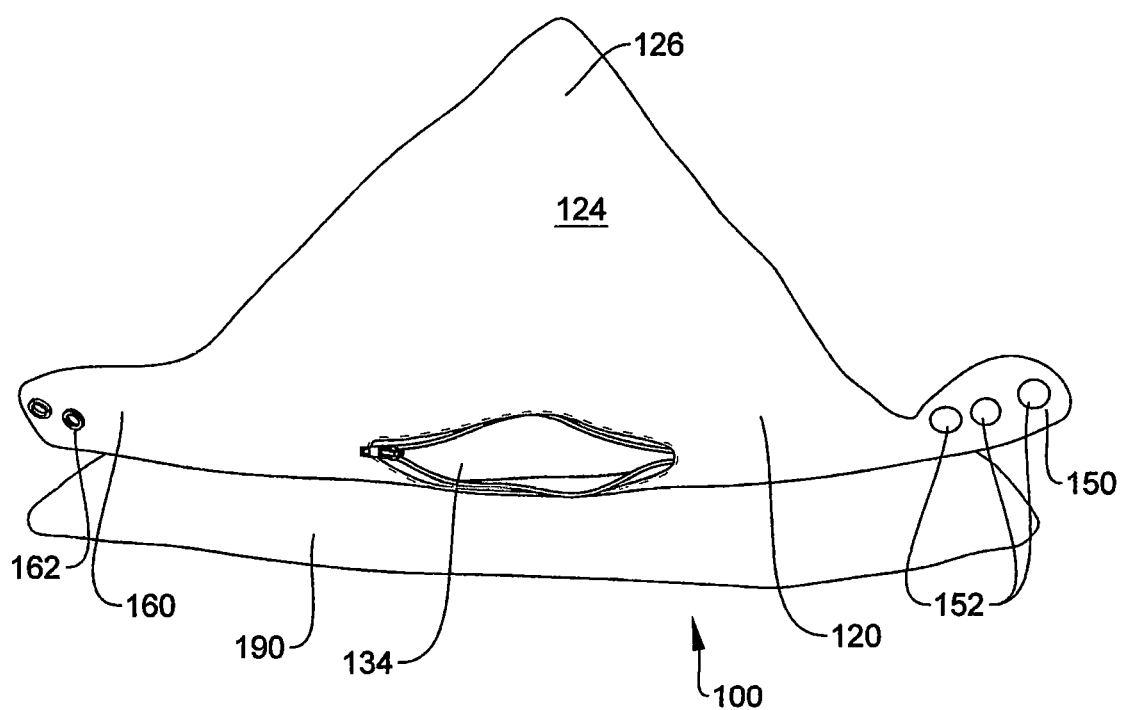
FIG. 6 is a top plan view of the bag-and-excrement holder similar to FIG. 4, but with the zipper of the excrement retaining receptacle open.
Figure 7:
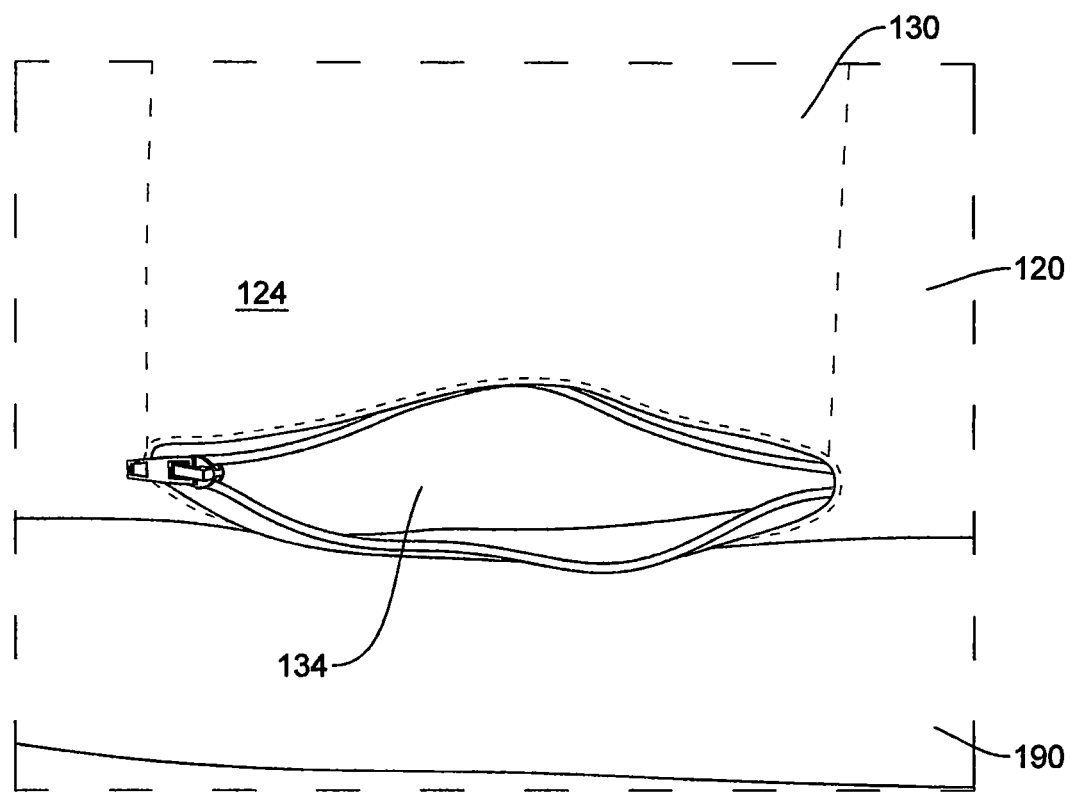
FIG. 7 is an enlarged top plan view of the bag-and-excrement holder similar to FIG. 5, but with the zipper of the excrement retaining receptacle open.
Figure 8:
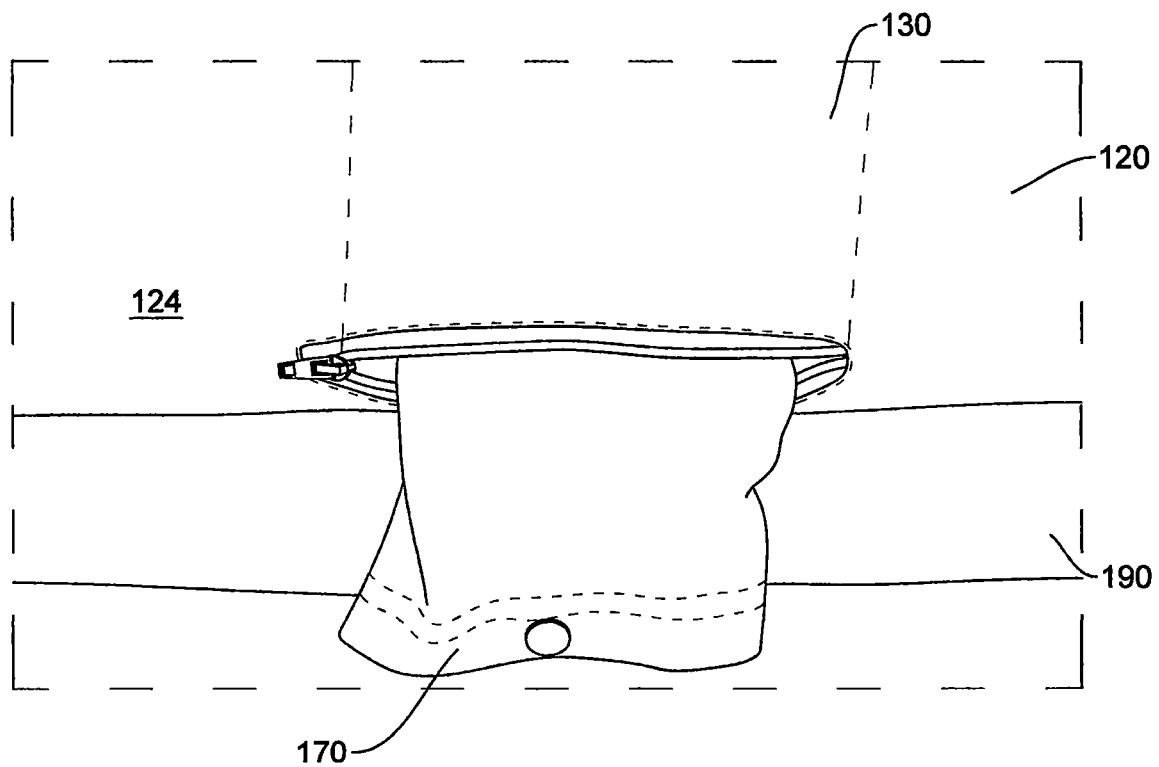
FIG. 8 is an enlarged top plan view of the bag-and-excrement holder similar to FIG. 7, but showing a secondary protective bag being removed from the excrement retaining receptacle.

The bag-and-excrement holder 100 further comprises a folder-over collar 190 at the front end of the main sheet portion 120. The folder-over collar 190 has a central rear portion 192 and front end portions 194. Further, the folder-over collar 190 has a folded-over mouth covering position, as is best seen in FIGS. 1-3, and a mouth exposing position, as is best seen in FIG. 4-8. In the mouth covering position, the folder-over collar 190, specifically the central rear portion 192, covers the mouth 134 of the excrement retaining receptacle 130, thereby retaining the beautiful aesthetics of the bag-and-excrement holder 100. In the mouth exposing position, the folder-over collar 190 is removed from covering the mouth 134 of the excrement retaining receptacle 130, to thereby allow ready access to the mouth of the excrement retaining receptacle 130. Further, the folder-over collar 190 is part of the reason why the Dookie BananaT™ is so highly fashionable and helps make a fashion statement out of the part of walking a pet that is otherwise undesirable.

As can be readily seen at least in FIGS. 1-4, 6 and 10, the bag-and-excrement holder 100 has a spread-out configuration. In FIGS. 1 and 2, the bag-and-excrement holder 100 is in place on a pet 102, and is a curved shape, and is in a spread-out configuration. In FIGS. 3, 4, 6 and 10, the bag-and-excrement holder 100 is not in place on a pet 102, and is a flat shape, and is in a spread-out configuration.

Figure 19:
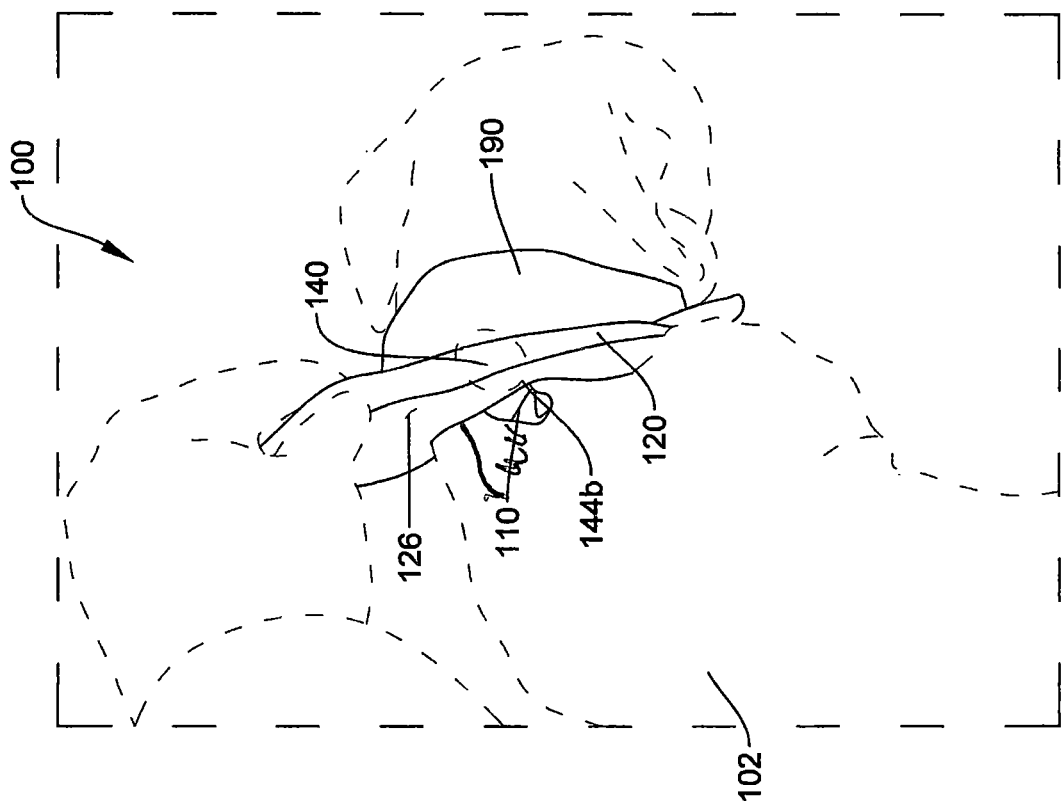
FIG. 19 is a top plan view of the bag-and-excrement holder of FIG. 1, with tail portion of the bag-and-excrement holder folded up and over the remainder of the main sheet portion, and showing an empty excrement retaining bags available for use.
Figure 20:
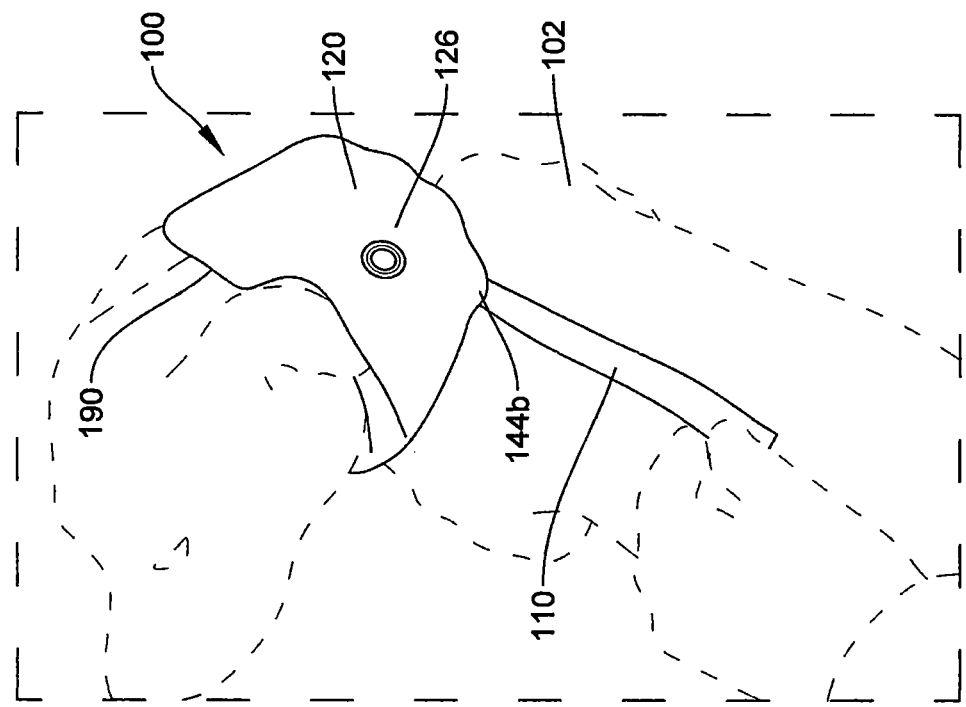
FIG. 20 is a top plan view of the bag-and-excrement holder of FIG. 19, with tail portion of the bag-and-excrement holder folded up and over the remainder of the main sheet portion and showing the empty excrement retaining bag being removed for use.
Figure 22:
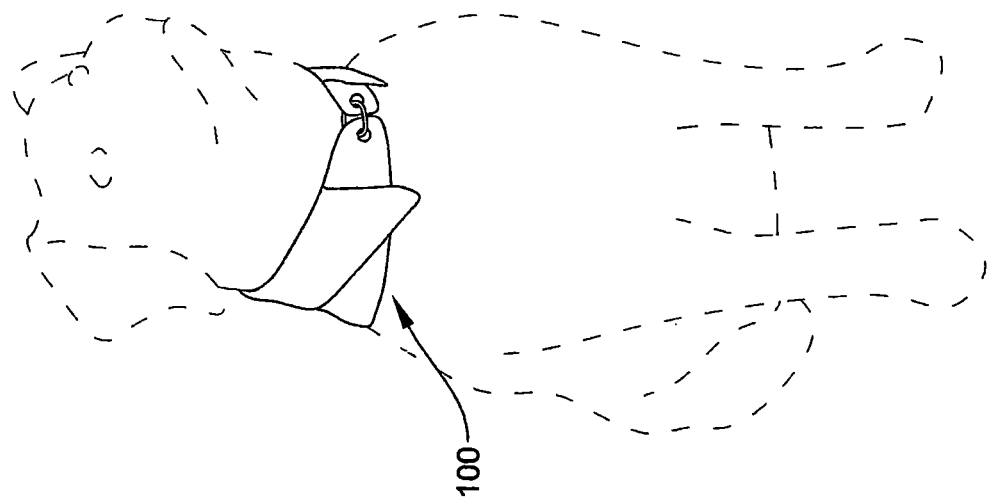
FIG. 22 is a front elevational view of the bag-and-excrement holder of FIG. 21 on a dog; and, FIG. 23 is a front view of a second illustrated embodiment of the bag-and-excrement holder according to the present invention.
Figure 21:
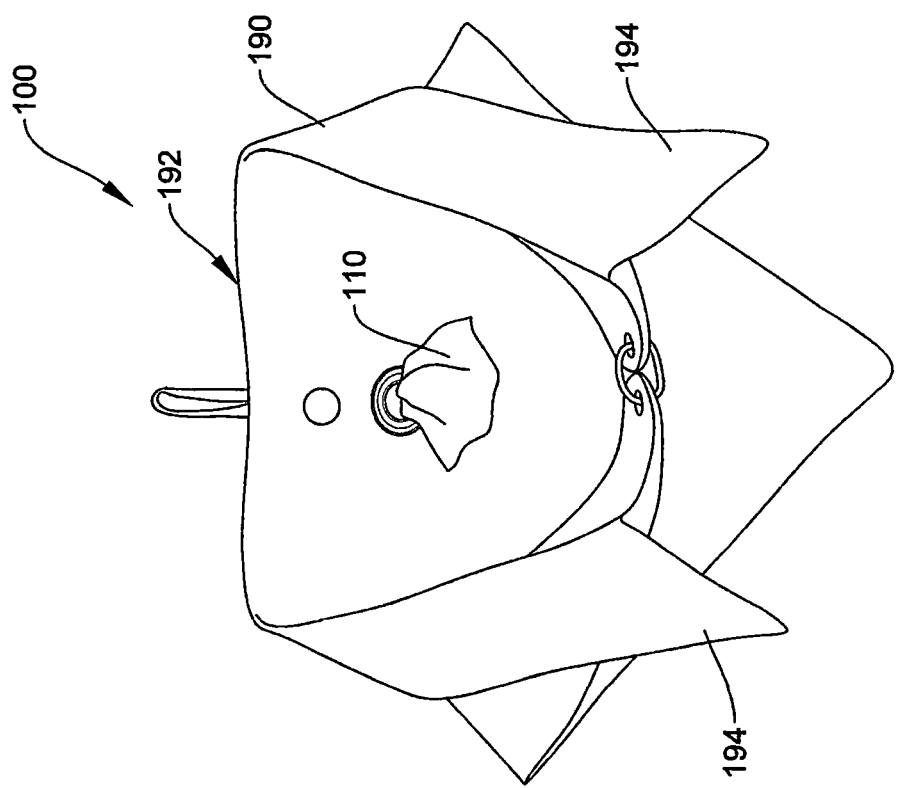
FIG. 21 is a front elevational view of the bag-and-excrement holder of FIG. 1.

The bag-and-excrement holder 100 also has a retaining bag access configuration, as is best seen in FIGS. 19 and 20. In the retaining bag access configuration, a tail portion 126 of the main sheet portion 120 is folded up and over the remainder of the main sheet portion 120 to thereby expose at least the second mouth 144b and maybe the first mouth 144a of the bag storage receptacle 140. As can be seen in FIGS. 19 and 20, an empty excrement retaining bag 110 is projecting out of the second mouth 144b of the bag storage receptacle 140, for ready grasping by the person walking the pet 102.

In use, as can be readily seen in FIGS. 1, 2, 3 and 4, the bag-and-excrement holder 100 is wrapped around neck of a pet 102. The first connection portion 150 and the second connection portion 160 are interconnected each with the other to retain the bag-and-excrement holder 100 in place in the spread-out configuration on the pet, with most of the pet facing surface 122 is against the pet 102. Further, the mouth 134 of the excrement retaining receptacle 130 faces outwardly, and the first mouth 144a and the second mouth 144b of the bag storage receptacle 140 faces the pet 102. When it is necessary to use one of the empty excrement retaining bags 110 in the bag storage receptacle 140, the tail portion 126 of the main sheet portion 120 is folded up and over the remainder of the main sheet portion 120 to thereby expose at least the second mouth 144b and maybe the first mouth 144a of the bag storage receptacle 140. The empty excrement retaining bag 110 that is projecting out of the second mouth 144b of the bag storage receptacle 140 can be conveniently grasped by the person walking the pet 102, or another person, and removed from the bag storage receptacle 140. Alternatively, the second mouth 144b of the bag storage receptacle 140 maybe shaped in dimension to permit a person's fingers to grasp an empty excrement retaining bag 110 from within the bag storage receptacle 140. Once an empty excrement retaining bag 110 has been removed from the bag storage receptacle 140, the bag-and-excrement holder 100 may be returned to its spread-out configuration.

The empty excrement retaining bag 110 may then be used to pick up and retain the pet excrement. The excrement retaining bag that is now full, or nearly full, and can be considered as used.

The secondary protective bag 170, which is for retaining a used excrement retaining bag 110u in protected relation therein, and is typically carried in the excrement retaining receptacle 130, may be removed from the excrement retaining receptacle 130. The mouth 134 of the excrement retaining receptacle 130 may need to be opened first. The used excrement retaining bag may be inserted into the secondary protective bag 170. Finally, the secondary protective bag 170 with the used excrement retaining bag 110u therein, can be inserted into the excrement retaining receptacle 130. The mouth 134 of the excrement retaining receptacle 130 should then be closed for sanitary reasons.

In another aspect, the present invention comprises a fashion garment 100 for pets. The fashion garment 100 comprises the main sheet portion 120 having the pet facing surface 122 and the outwardly facing surface 124. There is a first receptacle 130 having a mouth 134 at the outwardly facing surface 124 of the main sheet portion 120 and a second receptacle 140 having a first mouth 144a and a second mouth 144b at the pet facing surface 122 of the main sheet portion 120. The first connection portion 150 extends outwardly from the main sheet portion 120 and the second connection portion 160 extends outwardly from the main sheet portion 120. The fashion garment 100 has a spread-out configuration. In use, with the fashion garment 100 wrapped around neck of a pet 102, with the first connection portion 150 and the second connection portion 160 interconnected each with the other to retain the fashion garment in place in the spread-out configuration, most of the pet facing surface 122 is against the pet 102, the mouth 134 of the first receptacle 130 faces outwardly, and the first mouth 144a and a second mouth 144b of the second receptacle 140 faces the pet 102. The tail portion 126 of the main sheet portion 120 is folded up and over the remainder of the main sheet portion 120 to thereby expose at least the second mouth 144b and maybe the first mouth 144a of the second receptacle 140.

One of the important and unique features of the present invention is that the receptacles 130, 140 are hidden from view when the pet is out being walked. The excrement retaining receptacle/first receptacle 130 is hidden by the folder-over collar 190. The bag storage receptacle/second receptacle 140 is not visible because the mouths 144a,144b of the first mouth 144a and the second mouth 144b are each at the pet facing surface 122 of the main sheet portion 120. Accordingly, the bag-and-excrement holder/fashion garment is fashionable and stylish well retaining pet excrement therein.

One of the important and unique features of the present invention is that there are only three types of components used, namely cotton material, buttons and the clip 182.

Reference will now be made to FIG. 23, which shows a second illustrated embodiment according to the present invention. The second illustrated embodiment bag-and-excrement holder 200 is similar to the first illustrated embodiment bag-and-excrement holder, except that the first connection portion and the second connection portion are slightly different. The second illustrated embodiment bag-and-excrement holder 200 has a first connection portion 250 with apertures 252 and a second connection portion 260 with apertures 262. A tie-chord 270 extends through the apertures 252 and the apertures 262, and is tied off in a suitable manner that is easy to release, and is thereby used to interconnect the first connection portion 250 and the second connection portion 260.

Other variations of the above principles will be apparent to those who are knowledgeable in the field of the invention, and such variations are considered to be within the scope of the present invention. Further, other modifications and alterations may be used in the design and manufacture of the bicycle storage rack according to the present invention, without departing from the spirit and scope of the accompanying claims.

Other variations are within the spirit of the present invention. Thus, while the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising", "having", "including", and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as", "for example") provided herein, is intended merely to better illuminate embodiments of the invention and does not pose a limitation on the scope of the invention unless otherwise claimed. No language in the specification should be construed as indicating any non-claimed element as essential to the practice of the invention.

Illustrated embodiments of this invention are described herein. Variations of those illustrated embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A bag-and-excrement holder for use with pets, said holder comprising:
   a main sheet portion having a pet facing surface and an outwardly facing surface;
   an excrement retaining receptacle having a mouth at said outwardly facing surface of said main sheet portion for passing excrement retaining bags therethrough;
   a bag storage receptacle having a mouth at said pet facing surface of said main sheet portion for passing excrement retaining bags therethrough;
   a first connection portion extending outwardly from said main sheet portion; and,
   a second connection portion extending outwardly from said main sheet portion;
   wherein said bag-and-excrement holder has a spread-out configuration; and,
   wherein, in use, with said bag-and-excrement holder wrapped around neck of a pet, with said first connection portion and said second connection portion interconnected each with the other to retain said bag-and-excrement holder in place in said spread out configuration, most of said pet facing surface is against said pet, the mouth of said excrement retaining receptacle faces outwardly, and the mouth of said bag storage receptacle faces said pet. and;

wherein said bag-and-excrement holder also has a retaining bag access configuration, and wherein, in said retaining bag access configuration, a tail portion of said main sheet portion is folded over the remainder of said main sheet portion to thereby expose said mouth of said bag storage receptacle.

2. The bag-and-excrement holder according to claim 1, wherein said first interconnecting portion comprises a first strap portion and second interconnecting portion comprises a second strap portion.

3. The bag-and-excrement holder according to claim 2, wherein said first strap portion and said second strap portion extend in generally opposite directions each to the other.

4. The bag-and-excrement holder according to claim 1, further comprising a secondary protective bag for retaining a used excrement retaining bag in protected relation therein.

5. The bag-and-excrement holder according to claim 4, wherein said secondary protective bag is shaped and dimensioned to be received and retained within said excrement retaining receptacle.

6. The bag-and-excrement holder according to claim 1, wherein said mouth of said bag storage receptacle comprises a first mouth and a second mouth.

7. The bag-and-excrement holder according to claim 6, further comprising a foldable flap for selectively closing off and opening said first mouth, and wherein said second mouth comprises an open aperture.

8. The bag-and-excrement holder according to claim 1, further comprising a tie for anchoring said bag-and-excrement holder to a pet's collar.

9. The bag-and-excrement holder according to claim 1, further comprising a folder-over collar at the front end of said main sheet portion that has a mouth covering position whereat said folder-over collar covers the mouth of said excrement retaining receptacle and a mouth exposing position whereat said folder-over collar is removed from covering the mouth of said excrement retaining receptacle.

10. The bag-and-excrement holder according to claim 1, wherein said excrement retaining receptacle is defined by said main sheet portion.

11. The bag-and-excrement holder according to claim 1, wherein said excrement retaining receptacle is connected to said main sheet portion.

12. The bag-and-excrement holder according to claim 1, wherein said bag storage receptacle is defined by said main sheet portion.

13. The bag-and-excrement holder according to claim 1, wherein said bag storage receptacle is connected to said main sheet portion.

14. A fashion garment for pets, said fashion garment comprising:

a main sheet portion having a pet facing surface and an outwardly facing surface;

a first receptacle having a mouth at said outwardly facing surface of said main sheet portion;

a second receptacle having a mouth at said pet facing surface of said main sheet portion;

a first connection portion extending outwardly from said main sheet portion; and, a second connection portion extending outwardly from said main sheet portion;

wherein said fashion garment has a spread-out configuration;

wherein, in use, with said fashion garment wrapped around neck of a pet, with said first connection portion and said second connection portion interconnected each with the other to retain said fashion garment in place in said spread-out configuration, most of said pet facing surface is against said pet, the mouth of said first receptacle faces outwardly, and the mouth of said second receptacle faces said pet, and;

wherein said fashion garment also has a retaining bag access configuration, and wherein, in said access configuration, a tail portion of said main sheet portion is folded over the remainder of said main sheet portion to thereby expose said mouth of said second receptacle.

15. The fashion garment according to claim 14, wherein said first interconnecting portion comprises a first strap portion and second interconnecting portion comprises a second strap portion.

16. The fashion garment according to claim 15, wherein said first strap portion and said second strap portion extend in generally opposite directions each to the other.

17. The fashion garment according to claim 16, further comprising a secondary protective bag shaped and dimensioned to be received and retained within said first receptacle.

18. The fashion garment according to claim 14, wherein said mouth of said second receptacle comprises a first mouth and a second mouth.

* * * * *